(12) United States Patent
Chen et al.

(10) Patent No.: US 11,973,529 B2
(45) Date of Patent: Apr. 30, 2024

(54) SIGNAL TRANSCEIVER APPARATUS AND TERMINAL DEVICE

(71) Applicant: VIVO MOBILE COMMUNICATION CO., LTD., Guangdong (CN)

(72) Inventors: Fangsheng Chen, Dongguan (CN); Xuefeng Sheng, Dongguan (CN)

(73) Assignee: Vivo Mobile Communication Co., Ltd., Dongguan (CN)

( * ) Notice: Subject to any disclaimer, the term of this patent is extended or adjusted under 35 U.S.C. 154(b) by 246 days.

(21) Appl. No.: 17/382,034

(22) Filed: Jul. 21, 2021

(65) Prior Publication Data

US 2021/0351812 A1 Nov. 11, 2021

Related U.S. Application Data

(63) Continuation of application No. PCT/CN2020/073793, filed on Jan. 22, 2020.

(30) Foreign Application Priority Data

Jan. 24, 2019 (CN) .......................... 201910067093.2

(51) Int. Cl.
*H04B 1/44* (2006.01)
*H04B 1/16* (2006.01)
*H04B 1/40* (2015.01)

(52) U.S. Cl.
CPC ............. *H04B 1/44* (2013.01); *H04B 1/1615* (2013.01); *H04B 1/40* (2013.01)

(58) Field of Classification Search
CPC .......... H04B 1/1615; H04B 1/38; H04B 1/40; H04B 1/44; H04B 7/04

(Continued)

(56) References Cited

U.S. PATENT DOCUMENTS 10,567,029 B2  2/2020  Bai
2005/0227631 A1 10/2005 Robinett
(Continued)

FOREIGN PATENT DOCUMENTS

CN  106487415 A  3/2017
CN  106533493 A  3/2017
(Continued)

OTHER PUBLICATIONS

Supplementary European Search Report regarding Patent Application No. 20744687.3-1216/3917020; PCT/CN2020/073793, dated Feb. 17, 2022.

(Continued)

*Primary Examiner* — Young T. Tse

(74) *Attorney, Agent, or Firm* — Harness, Dickey & Pierce, P.L.C.

(57) ABSTRACT

A signal transceiver apparatus includes: a first communication module and a second communication module; a first switch connected to a first terminal of the first communication module and a first terminal of the second communication module, respectively; a second switch connected to a first transmitting/receiving port and a first signal reception port of the first communication module, and a first antenna structure connected to the second switch; and a third switch connected to a second transmitting/receiving port and a second signal reception port of the second communication module, and a second antenna structure connected to the third switch. The first communication module corresponds to a first transmitting link and two receiving links, and the second communication module corresponds to a second transmitting link and two receiving links.

11 Claims, 3 Drawing Sheets

(58) Field of Classification Search
USPC ....... 375/219, 220, 222, 267; 455/73, 78, 88
See application file for complete search history.

(56) References Cited

U.S. PATENT DOCUMENTS

| | | | |
|---|---|---|---|
| 2017/0099075 A1 | 4/2017 | Chiang | |
| 2018/0034151 A1* | 2/2018 | McCarthy | H01Q 3/24 |
| 2018/0034152 A1* | 2/2018 | Mura | H04B 1/006 |
| 2018/0048336 A1 | 2/2018 | Oshita | |
| 2018/0131501 A1 | 5/2018 | Little | |
| 2018/0337701 A1 | 11/2018 | Tsai et al. | |
| 2019/0288731 A1* | 9/2019 | Bai | H04B 1/40 |

FOREIGN PATENT DOCUMENTS

| | | | |
|---|---|---|---|
| CN | 107124191 A | 9/2017 | |
| CN | 107528606 A | 12/2017 | |
| CN | 108462497 A | 8/2018 | |
| CN | 108649971 A | 10/2018 | |
| CN | 108768434 A | 11/2018 | |
| CN | 109246804 A | 1/2019 | |
| CN | 109802699 A | 5/2019 | |
| EP | 3203652 A1 | 8/2017 | |
| WO | WO-2020145421 A1 * | 7/2020 | |

OTHER PUBLICATIONS

International Search Report and Written Opinion of the International Searching Authority regarding International Patent Application No. PCT/CN2020/073793, dated Apr. 22, 2020. Translation provided by Bohui Intellectual Property.

First Office Action regarding Chinese Patent Application No. 201910067093.2, dated Mar. 13, 2020. Translation provided by Bohui Intellectual Property.

Second Office Action regarding Chinese Patent Application No. 201910067093.2, dated Sep. 30, 2020. Translation provided by Bohui Intellectual Property.

* cited by examiner

SIGNAL TRANSCEIVER APPARATUS AND TERMINAL DEVICE

CROSS-REFERENCE TO RELATED APPLICATIONS

This application is a Bypass Continuation Application of PCT/CN2020/073793 filed on Jan. 22, 2020, which claims priority to Chinese Patent Application No. 201910067093.2 filed on Jan. 24, 2019, which are incorporated herein by reference in their entirety.

TECHNICAL FIELD

The present disclosure relates to the field of communication technologies, and in particular, to a signal transceiver apparatus and a terminal device.

BACKGROUND

With the development of economy and technologies and the continuous advancement of science and technologies, users have more and more requirements for mobile communication technologies. For example, users require for high reliability and a low latency to meet applications requirements of Internet of Vehicles, autonomous driving, telemedicine, and the like; users require for a higher communication rate to support an application requirement of ultra-high-definition videos; users require for low power consumption, large-connection scenarios, high traffic density, and the like to meet the requirements for widespread coverage of the Internet of Things and hotspot communication in smart industry and agriculture, and the like. To meet these requirements, the fifth-generation (5G) mobile communication technology appears. 5G introduces a new broadband spectrum, for example, a millimeter wave band and a band below 6G (sub 6G) meet broadband high-speed and low-latency coverage requirements, where sub 6G is divided into bands of 3.5 GHz (3.3 GHz to 4.2 GHz) and 4.5 GHz (4.4 GHz to 5.0 GHz). At the same time, a large-scale antenna technology, multiple access, beamforming, high-power terminal, and other technologies are further used to meet the above needs.

SUMMARY

According to a first aspect, an embodiment of the present disclosure provides a signal transceiver apparatus, including:
a first communication module and a second communication module;
a first switch connected to a first terminal of the first communication module and a first terminal of the second communication module, respectively;
a second switch connected to a second terminal of the first communication module, and a first antenna structure connected to the second switch; and
a third switch connected to a second terminal of the second communication module, and a second antenna structure connected to the third switch; where
the first communication module corresponds to a first transmitting link and two receiving links, the second communication module corresponds to a second transmitting link and two receiving links; in a case of signal transmission, at least one of the first transmitting link and the second transmitting link is in a conductive state, and in a case of signal reception, the two receiving links corresponding to the first communication module and the two receiving links corresponding to the second communication module are all in a conductive state.

According to a second aspect, an embodiment of this disclosure provides a terminal device, including the signal transceiver apparatus.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

Figure 1:
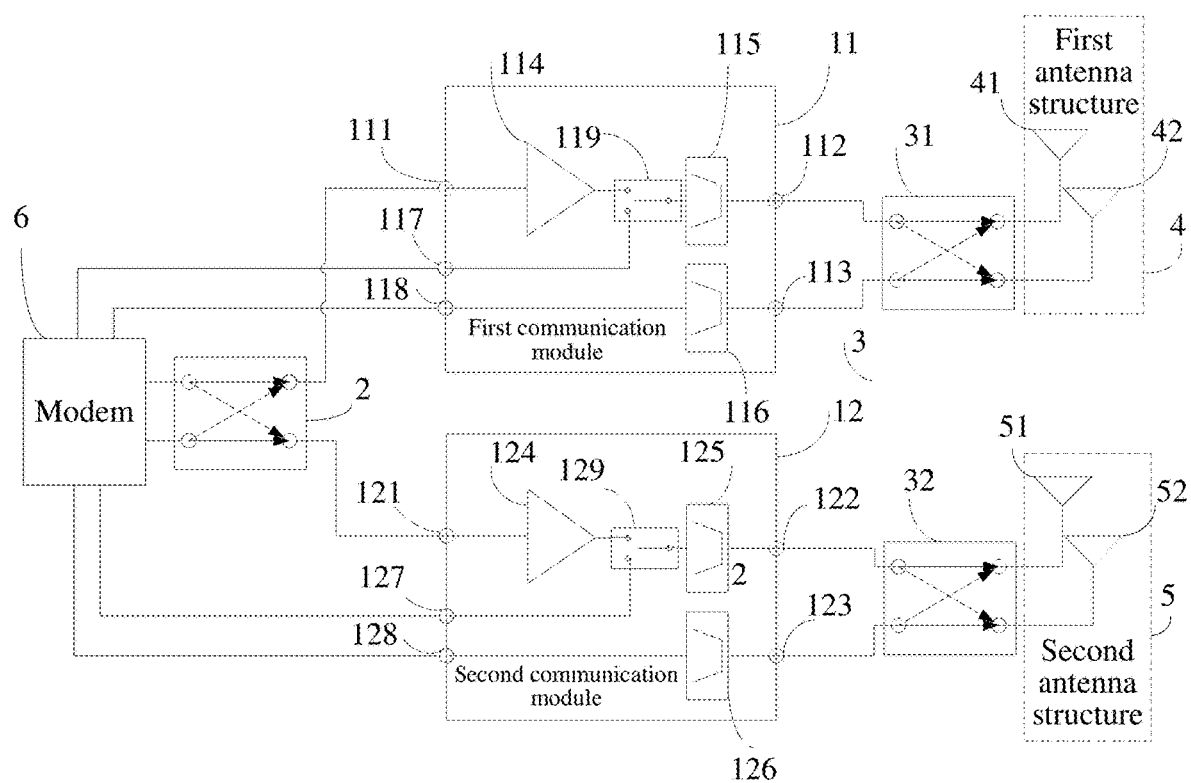
FIG. 1 is a schematic diagram of a signal transceiver apparatus according to an embodiment of this disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "and/or" in this specification describes only an association relationship for describing associated objects and represents that three relationships may exist. For example, A and/or B may represent the following three cases: Only A exists, both A and B exist, and only B exists.

At present, the 5G spectrum is planned as follows:

| Band number | Uplink frequency (MHZ) | Downlink frequency (MHZ) | Duplex mode |
| --- | --- | --- | --- |
| n1 | 1920-1980 | 2110-2170 | Frequency division duplex |
| n2 | 1850-1910 | 1930-1990 | Frequency division duplex |
| n3 | 1710-1785 | 1805-1880 | Frequency division duplex |
| n5 | 824-849 | 869-894 | Frequency division duplex |
| n7 | 2500-2570 | 2620-2690 | Frequency division duplex |
| n8 | 880-915 | 925-960 | Frequency division duplex |
| n20 | 832-862 | 791-821 | Frequency division duplex |
| n28 | 703-748 | 758-803 | Frequency division duplex |
| n38 | 2570-2620 | 2570-2621 | Time division duplex |
| n41 | 2496-2690 | 2496-2691 | Time division duplex |
| n50 | 1432-1517 | 1432-1517 | Time division duplex |
| n51 | 1427-1432 | 1427-1432 | Time division duplex |
| n66 | 1710-1780 | 2110-2200 | Frequency division duplex |

-continued

| Band number | Uplink frequency (MHZ) | Downlink frequency (MHZ) | Duplex mode |
|---|---|---|---|
| n70 | 1695-1710 | 1995-2020 | Frequency division duplex |
| n71 | 663-698 | 617-652 | Frequency division duplex |
| n74 | 1427-1470 | 1475-1518 | Frequency division duplex |
| n75 | N/A | 1432-1517 | Supplementary downlink |
| n76 | N/A | 1427-1432 | Supplementary downlink |
| n77 | 3300-4200 | 3300-4200 | Time division duplex |
| n78 | 3300-3800 | 3300-3800 | Time division duplex |
| n79 | 4400-5000 | 4400-5000 | Time division duplex |
| n80 | 1710-1785 | N/A | Supplementary uplink |
| n81 | 880-915 | N/A | Supplementary uplink |
| n82 | 832-862 | N/A | Supplementary uplink |
| n83 | 703-748 | N/A | Supplementary uplink |
| n84 | 1920-1980 | N/A | Supplementary uplink |

It may be seen from the above list that the newly added sub 6G bands of 5G, that is, the n77, n78, and n79 bands all use time division duplexing (TDD) mode. Therefore, the proportion of TDD in 5G will increase, and more attention will be paid to the application of TDD. In addition, n1, n2, n3, n5, n7, n8, n38, n41, and other bands are all spectrum refarming bands of long term evolution (LTE). Therefore, 4G and 5G will coexist for a long time. The terminal products tend to be lightweight and portable. The long-term coexistence of 4G and 5G will increase the printed circuit board (PCB) area and product weight of a terminal product. Therefore, decreasing the size and the weight of a terminal product is a major challenge at present. Because of the long-term coexistence of 4G and 5G, the large-scale access of 5G, and a high-power terminal technology, there are cases of transmitting by using one link and receiving by using four links (1T4R) and transmitting by using two links and receiving by using four links (2T4R). Therefore, the design of a radio frequency link becomes complicated. The realization of compatibility between multiple scenarios in a radio frequency architecture makes the design of a radio frequency link simple and convenient.

At present, the compatible solution of 1T4R and 2T4R has a complex design architecture, use immature materials such as 3P3T (the larger the number of T, the worse the performance), and the wire is long, which affects the overall transmitting and receiving performance. Performance of 3P3T or 4P4T is worse than that of double-pole-double-throw (DPDT) switch, resulting in a large overall loss on a receiving channel. In addition, due to the price effect of new materials, the costs are much higher than those of the DPDT. In addition, in the current design solution, there is a port that is not used, which is very wasteful and occupies a larger PCB area. This increases the complexity of the design and the costs of the terminal product.

An embodiment of the present disclosure provides a signal transceiver apparatus. As shown in FIG. 1, the apparatus includes:

a first communication module 11 and a second communication module 12; a first switch 2 connected to a first terminal of the first communication module 11 and a first terminal of the second communication module 12, respectively; a second switch 31 connected to a second terminal of the first communication module 11, and a first antenna structure 4 connected to the second switch 31; and a third switch 32 connected to a second terminal of the second communication module 12, and a second antenna structure 5 connected to the third switch 32.

The first communication module 11 corresponds to a first transmitting link and two receiving links, the second communication module 12 corresponds to a second transmitting link and two receiving links; in a case of signal transmission, at least one of the first transmitting link and the second transmitting link is in a conductive state, and in a case of signal reception, the two receiving links corresponding to the first communication module 11 and the two receiving links corresponding to the second communication module 12 are all in a conductive state.

The signal transceiver apparatus provided in the embodiments of the present disclosure includes: the first communication module 11, the second communication module 12, the first switch 2, the second switch 31, the third switch 32, the first antenna structure 4, and the second antenna structure 5. The first terminal of the first communication module 11 and the first terminal of the second communication module 12 are both connected to the first switch 2, the second terminal of the first communication module 11 is connected to the first antenna structure 4 through the second switch 31, and the second terminal of the second communication module 12 is connected to the second antenna structure 5 through the third switch 32.

The first communication module 11 corresponds to a first transmitting link and two receiving links, the second communication module 12 corresponds to a second transmitting link and two receiving links; in a case of signal transmission, the first transmitting link of the first communication module 11 and/or the second transmitting link of the second communication module 12 is conducted, and in a case of signal reception, the two receiving links of the first communication module 11 and the two receiving links of the second communication module 12 are all conducted.

In a case that the first transmitting link of the first communication module 11 or the second transmitting link of the second communication module 12 is conducted, and the two receiving links of the first communication module 11 and the two receiving links of the second communication module 12 are all conducted, the mode of transmitting by using one link and receiving by using four links (1T4R) may be implemented. In a case that the first transmitting link of the first communication module 11 and the second transmitting link of the second communication module 12 are conducted, and the two receiving links of the first communication module 11 and the two receiving links of the second communication module 12 are all conducted, the mode of transmitting by using two links and receiving by using four links (2T4R) may be implemented.

The signal transceiver apparatus of the present disclosure can ensure the compatibility between two modes of transmitting by using one link and receiving by using four links and transmitting by using two links and receiving by using four links. In addition, the structural design can reduce insertion loss of the receiving link, improve performance of the transmitting link, shorten a wire length, and reduce the design complexity of the terminal device and reduce manufacturing costs.

In the embodiments of the present disclosure, as shown in FIG. 1, the first switch 2, the second switch 31, and the third switch 32 are all double-pole-double-throw switches. The signal transceiver apparatus further includes: a modem 6. A first terminal of the first switch 2 is connected to a first port and a second port of the modem 6, and a second terminal of the first switch 2 is connected to a first transmitting port 111 of the first communication module 11 and a second transmitting port 121 of the second communication module 12.

The first switch 2 is a double-pole-double-throw switch, the first switch 2 may be connected to the first communication module 11 and the second communication module 12, and the first terminal of the first switch 2 is connected to the modem 6, and for example, connected to the first port and the second port of the modem 6. Herein, the first port and the second port are both transmitting ports. The first communication module 11 includes the first transmitting port 111, the second communication module 12 includes the second transmitting port 121. The first transmitting port 111 is located at the first terminal of the first communication module 11, the second transmitting port 121 is located at the first terminal of the second communication module 12. The second terminal of the first switch 2 is connected to the first transmitting port 111 of the first communication module 11 and the second transmitting port 121 of the second communication module 12.

The first transmitting port 111 may be connected to the first non-movable terminal of the first switch 2, the second transmitting port 121 is connected to the second non-movable terminal of the first switch 2, the first movable terminal of the first switch 2 is connected to the first port of the modem 6, and the second movable terminal of the first switch 2 is connected to the second port of the modem 6. The first movable terminal of the first switch 2 may be connected to the first non-movable terminal, and the second movable terminal may be connected to the second non-movable terminal, so that the first transmitting port 111 is connected to the first port of the modem 6, and the second transmitting port 121 is connected to the second port of the modem 6. The first movable terminal of the first switch 2 may be connected to the second non-movable terminal, and the second movable terminal may be connected to the first non-movable terminal, so that the first transmitting port 111 is connected to the second port of the modem 6, and the second transmitting port 121 is connected to the first port of the modem 6.

The modem 6 may be connected to a baseband processor. In a case of signal transmission, the modem 6 converts a baseband signal transmitted by the baseband processor into a radio frequency signal, and sends the radio frequency signal through the first transmitting link and/or the second transmitting link; and in a case of signal reception, converts a received radio frequency signal into a baseband signal and transmits the baseband signal to the baseband processor, to implement processing of signal transmission and signal reception.

In the embodiments of the present disclosure, as shown in FIG. 1, a first terminal of the second switch 31 is connected to a first transmitting/receiving port 112 and a first signal reception port 113 of the first communication module 11, and a second terminal of the second switch 31 is connected to a first antenna 41 and a second antenna 42 of the first antenna structure 4.

The first communication module 11 includes the first transmitting/receiving port 112 and the first signal reception port 113 located at the second terminal, the first antenna structure 4 includes the first antenna 41 and the second antenna 42, and the second switch 31 is disposed between the first communication module 11 and the first antenna structure 4. In addition, because the second switch 31 is a double-pole-double-throw switch, a first terminal of the second switch 31 may be connected to a first transmitting/receiving port 112 and a first signal reception port 113, and a second terminal of the second switch 31 is connected to a first antenna 41 and a second antenna 42.

The first transmitting/receiving port 112 is connected to the first movable terminal of the second switch 31, the first signal reception port 113 is connected to the second movable terminal of the second switch 31, and the first non-movable terminal and the second non-movable terminal of the second switch 31 are connected to the first antenna 41 and the second antenna 42 of the first antenna structure 4. The first movable terminal of the second switch 31 may be connected to the first non-movable terminal, and the second movable terminal of the second switch 31 may be connected to the second non-movable terminal, so that the first transmitting/receiving port 112 is connected to the first antenna 41, and the first signal reception port 113 is connected to the second antenna 42. The first movable terminal of the second switch 31 further may be connected to the second non-movable terminal, and the second movable terminal may be connected to the first non-movable terminal, so that the first transmitting/receiving port 112 is connected to the second antenna 42, and the first signal reception port 113 is connected to the first antenna 41.

That is, the first transmitting/receiving port 112 may be connected to the first antenna 41, and the first signal reception port 113 may be connected to the second antenna 42 by the second switch 31, or the first transmitting/receiving port 112 may be connected to the second antenna 42, and the first signal reception port 113 may be connected to the first antenna 41 by the second switch 31.

In the embodiments of the present disclosure, a first terminal of the third switch 32 is connected to a second transmitting/receiving port 122 and a second signal reception port 123 of the second communication module 12, and a second terminal of the third switch 32 is connected to a third antenna 51 and a fourth antenna 52 of the second antenna structure 5.

The second communication module 12 includes the second transmitting/receiving port 122 and the second signal reception port 123 located at the second terminal, the second antenna structure 5 includes the third antenna 51 and the fourth antenna 52, and the third switch 32 is disposed between the second communication module 12 and the second antenna structure 5. In addition, because the third switch 32 is a double-pole-double-throw switch, a first terminal of the third switch 32 may be connected to a second transmitting/receiving port 122 and a second signal reception port 123, and a second terminal of the third switch 32 is connected to a third antenna 51 and a fourth antenna 52.

The second transmitting/receiving port 122 is connected to the first movable terminal of the third switch 32, the second signal reception port 123 is connected to the second movable terminal of the third switch 32, and the first non-movable terminal and the second non-movable terminal of the third switch 32 are connected to the third antenna 51 and the fourth antenna 52 of the second antenna structure 5. The first movable terminal of the third switch 32 may be connected to the first non-movable terminal, and the second movable terminal of the third switch 32 may be connected to the second non-movable terminal, so that the second transmitting/receiving port 122 is connected to the third antenna 51, and the second signal reception port 123 is connected to the fourth antenna 52. The first movable terminal of the third switch 32 further may be connected to the second non-movable terminal, and the second movable terminal may be connected to the first non-movable terminal, so that the second transmitting/receiving port 122 is connected to the fourth antenna 52, and the second signal reception port 123 is connected to the third antenna 51.

That is, the second transmitting/receiving port 122 is connected to the third antenna 51, and the second signal reception port 123 is connected to the fourth antenna 52 by the third switch 32, or the second transmitting/receiving port 122 is connected to the fourth antenna 52, and the second signal reception port 123 is connected to the third antenna 51 by the third switch 32.

The mature double-pole-double-throw switch with advantages in both insertion loss and isolation is used to replace the 3P3T disposed between the communication module and the antenna structure, which can reduce insertion loss of a receiving path and reduce costs. At the same time, the double-pole-double-throw switch is added before the transmitting link (between the communication module and the modem), which can eliminate the insertion loss and load impact, improve the transmitting performance, and shorten the wire length. In addition, this can achieve compatibility between two modes of transmitting by using one link and receiving by using four links and transmitting by using two links and receiving by using four links, and reduce the complexity of design of a radio frequency link.

In the embodiments of the present disclosure, as shown in FIG. 1, the first communication module 11 further includes: the first power amplifier 114, the first transmitting/receiving filter 115, the first receiving filter 116, the first transmission port 117, the second transmission port 118, and the first single-pole-double-throw switch 119. The first power amplifier 114 is connected to the first transmitting port 111, the first transmitting/receiving filter 115 is connected to the first transmitting/receiving port 112, a first non-movable terminal of the first single-pole-double-throw switch 119 is connected to the first power amplifier 114, a second non-movable terminal of the first single-pole-double-throw switch 119 is connected to the first transmission port 117, a movable terminal of the first single-pole-double-throw switch 119 is connected to the first transmitting/receiving filter 115, the second transmission port 118 is connected to the first signal reception port 113 through the first receiving filter 116, and the first transmission port 117 and the second transmission port 118 are both connected to a receiving port of the modem 6.

In addition to the first transmitting port 111, the first transmitting/receiving port 112, and the first signal reception port 113, the first communication module 11 further includes: a first power amplifier 114 for power amplification connected to the first transmitting port 111, a first transmitting/receiving filter 115 for transmitting and receiving multiplexing connected to the first transmitting/receiving port 112, a first transmission port 117 and a second transmission port 118 located at the same terminal as that of the first transmitting port 111, a first receiving filter 116 disposed between the second transmission port 118 and the first signal reception port 113 and connected to the second transmission port 118 and the first signal reception port 113, and a first single-pole-double-throw switch 119 for switching between transmitting and receiving links. Two non-movable terminals of the first single-pole-double-throw switch 119 are connected to the first power amplifier 114 and the first transmission port 117, and the movable terminal of the first single-pole-double-throw switch 119 is connected to the first transmitting/receiving filter 115. Through switch switching of the first single-pole-double-throw switch 119, the first transmitting/receiving filter 115 may be connected to the first power amplifier 114, or the first transmitting/receiving filter 115 may be connected to the first transmission port 117.

The first transmission port 117 and the second transmission port 118 are receiving ports, and are both connected to the receiving port of the modem 6 to transmit a received radio frequency signal to the modem 6.

In a case that the first transmitting link corresponding to the first communication module 11 is conducted, the movable terminal and the first non-movable terminal of the first single-pole-double-throw switch 119 are connected. At this time, the first single-pole-double-throw switch 119 connects the first power amplifier 114 to the first transmitting/receiving filter 115. The modem 6, the first switch 2, the first transmitting port 111, the first power amplifier 114, the first single-pole-double-throw switch 119, the first transmitting/receiving filter 115, the first transmitting/receiving port 112, the second switch 31, and a first transmitting antenna are connected in sequence, and the first transmitting antenna is the first antenna 41 or the second antenna 42.

In a case that the first single-pole-double-throw switch 119 connects the first power amplifier 114 to the first transmitting/receiving filter 115, the modem 6, the first switch 2, the first transmitting port 111, the first power amplifier 114, the first single-pole-double-throw switch 119, the first transmitting/receiving filter 115, the first transmitting/receiving port 112, the second switch 31, and a first transmitting antenna are connected, so that the first transmitting link may be formed.

The first communication module 11 corresponds to the first receiving link and the second receiving link. In a case that the first receiving link corresponding to the first communication module 11 is conducted, the movable terminal of the first single-pole-double-throw switch 119 is connected to the second non-movable terminal, a first receiving antenna, the second switch 31, the first transmitting/receiving port 112, the first transmitting/receiving filter 115, the first single-pole-double-throw switch 119, the first transmission port 117, and the modem 6 are connected in sequence. In a case that the second receiving link corresponding to the first communication module 11 is conducted, a second receiving antenna, the second switch 31, the first signal reception port 113, the first receiving filter 116, the second transmission port 118, and the modem 6 are connected in sequence. Each of the first receiving antenna and the second receiving antenna is one of the first antenna 41, the second antenna 42.

In a case that the first single-pole-double-throw switch 119 connects the first transmission port 117 to the first transmitting/receiving filter 115, the first receiving antenna, the second switch 31, the first transmitting/receiving port 112, the first transmitting/receiving filter 115, the first single-pole-double-throw switch 119, the first transmission port 117, and the modem 6 are connected, so that the first receiving link may be formed. The second receiving antenna, the second switch 31, the first signal reception port 113, the first receiving filter 116, the second transmission port 118, and the modem 6 are connected in sequence; and are always in a conductive state, so that the second receiving link may be formed. In a case that the first receiving link is conducted, the first power amplifier 114 may be in an off state.

Each of the first receiving antenna and the second receiving antenna is one of the first antenna 41 and the second antenna 42, that is, in a case that the first receiving antenna is the first antenna 41, the second receiving antenna is the second antenna 42. Correspondingly, in a case that the first receiving antenna is the second antenna 42, the second receiving antenna is the first antenna 41.

In the embodiments of the present disclosure, as shown in FIG. 1, the second communication module 12 further includes: a second power amplifier 124, a second transmitting/receiving filter 125, a second receiving filter 126, a third transmission port 127, a fourth transmission port 128, and a second single-pole-double-throw switch 129; where the second power amplifier 124 is connected to the second transmitting port 121, the second transmitting/receiving filter 125 is connected to the second transmitting/receiving port 122, a first non-movable terminal of the second single-pole-double-throw switch 129 is connected to the second power amplifier 124, a second non-movable terminal of the second single-pole-double-throw switch 129 is connected to the third transmission port 127, a movable terminal of the second single-pole-double-throw switch 129 is connected to the second transmitting/receiving filter 125, the fourth transmission port 128 is connected to the second signal reception port 123 through the second receiving filter 126, and the third transmission port 127 and the fourth transmission port 128 are both connected to a receiving port of the modem 6.

In addition to the second transmitting port 121, the second transmitting/receiving port 122, and the second signal reception port 123, the second communication module 12 further includes: a second power amplifier 124 for power amplification connected to the second transmitting port 121, a second transmitting/receiving filter 125 for transmitting and receiving multiplexing connected to the second transmitting/receiving port 122, a third transmission port 127 and a fourth transmission port 128 located at the same terminal as the second transmitting port 121, a second receiving filter 126 disposed between the fourth transmission port 128 and the second signal reception port 123 and connected to the fourth transmission port 128 and the second signal reception port 123, and a second single-pole-double-throw switch 129 for switching a transmitting and receiving link. Two non-movable terminals of the second single-pole-double-throw switch 129 are connected to the second power amplifier 124 and the third transmission port 127, and the movable terminal of the second single-pole-double-throw switch 129 is connected to the second transmitting/receiving filter 125. Through state switching of the second single-pole-double-throw switch 129, the second transmitting/receiving filter 125 may be connected to the second power amplifier 124, or the second transmitting/receiving filter 125 may be connected to the third transmission port 127. The third transmission port 127 and the fourth transmission port 128 are receiving ports, and are both connected to the receiving port of the modem 6, to transmit a received radio frequency signal to the modem 6.

In a case that the second transmitting link corresponding to the second communication module 12 is conducted, the movable terminal and the first non-movable terminal of the second single-pole-double-throw switch 129 are connected, the modem 6, the first switch 2, the second transmitting port 121, the second power amplifier 124, the second single-pole-double-throw switch 129, the second transmitting/receiving filter 125, the second transmitting/receiving port 122, the third switch 32, and a second transmitting antenna are connected in sequence, and the second transmitting antenna is the third antenna 51 or the fourth antenna 52.

In a case that the second single-pole-double-throw switch 129 connects the second power amplifier 124 to the second transmitting/receiving filter 125, the modem 6, the first switch 2, the second transmitting port 121, the second power amplifier 124, the second single-pole-double-throw switch 129, the second transmitting/receiving filter 125, the second transmitting/receiving port 122, the third switch 32, and a second transmitting antenna are connected, so that the second transmitting link may be formed.

The second communication module 12 corresponds to the third receiving link and the fourth receiving link. In a case that the third receiving link corresponding to the second communication module 12 is conducted, the movable terminal of the second single-pole-double-throw switch 129 is connected to the second non-movable terminal, a third receiving antenna, the third switch 32, the second transmitting/receiving port 122, the second transmitting/receiving filter 125, the second single-pole-double-throw switch 129, the third transmission port 127, and the modem 6 are connected in sequence. In a case that the fourth receiving link corresponding to the second communication module 12 is conducted, a fourth receiving antenna, the third switch 32, the second signal reception port 123, the second receiving filter 126, the fourth transmission port 128, and the modem 6 are connected in sequence. Each of the third receiving antenna and the fourth receiving antenna is one of the third antenna 51 and the fourth antenna 52.

In a case that the second single-pole-double-throw switch 129 connects the third transmission port 127 to the second transmitting/receiving filter 125, the third receiving antenna, the third switch 32, the second transmitting/receiving port 122, the second transmitting/receiving filter 125, the second single-pole-double-throw switch 129, the third transmission port 127, and the modem 6 are connected, so that the third receiving link may be formed. The fourth receiving antenna, the third switch 32, the second signal reception port 123, the second receiving filter 126, the fourth transmission port 128, and the modem 6 are connected in sequence; and are always in a conductive state, so that the fourth receiving link may be formed. In a case that the third receiving link is conducted, the second power amplifier 124 may be in an off state.

In a case that the third receiving antenna is the third antenna 51, the fourth receiving antenna is the fourth antenna 52. Correspondingly, in a case that the third receiving antenna is the fourth antenna 52, the fourth receiving antenna is the third antenna 51.

In the foregoing embodiments of the present disclosure, the first communication module 11 and the second communication module 12 are both 5G communication modules, which may realize compatibility of two modes of transmitting by using one link and receiving by using four links and transmitting by using two links and receiving by using four links in 4G and 5G coexistence mode and 5G large-scale access. This reduces the design complexity of the terminal device, improves performance, and reduces manufacturing costs.

Optionally, the first communication module 11 and the second communication module 12 may be communication circuits or communication chips.

In the signal transceiver apparatus provided in the embodiments of the present disclosure, the first terminal of the first communication module and the first terminal of the second communication module are respectively connected to the first switch, the second switch is disposed between the second terminal of the first communication module and the first antenna structure, and the third switch is disposed between the second terminal of the second communication module and the second antenna structure. By setting connection states of the three switches, in a case of signal transmission, at least one of the first transmitting link corresponding to the first communication module and the second transmitting link corresponding to the second communication module is in a conductive state. In a case of signal reception, the two receiving links corresponding to the first communication module and the two receiving links corresponding to the second communication module are all in a conductive state. This can ensure the compatibility between modes of transmitting by using one link and receiving by using four links and transmitting by using two links and receiving by using four links. In addition, the structural design can reduce insertion loss of the receiving link, improve performance of the transmitting link, shorten a wire length, and reduce the design complexity of the terminal device and reduce manufacturing costs.

Figure 2:
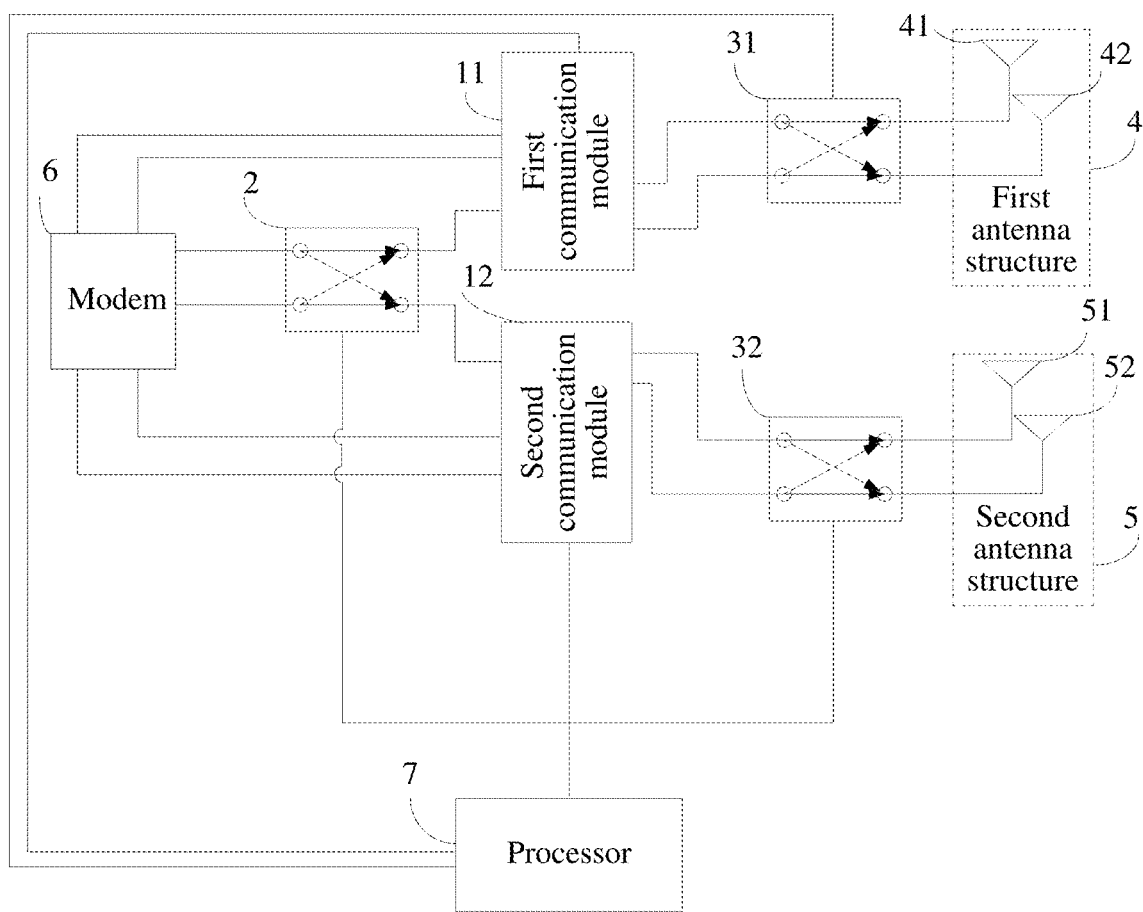
FIG. 2 is a schematic diagram of cooperation between a signal transceiver apparatus and a processor according to an embodiment of this disclosure.

An embodiment of this disclosure further provides a terminal device, including the signal transceiver apparatus. As shown in FIG. 2, the terminal device further includes a processor 7, which is connected to the signal transceiver apparatus, and may control the operation of the signal transceiver apparatus.

The processor 7 may be connected to the first switch 2, the second switch 31, the third switch 32, the first communication module 11, and the second communication module 12 of the signal transceiver apparatus. In the mode of transmitting by using two links and receiving by using four links, the processor 7 may determine the first transmitting antenna in the first antenna 41 and the second antenna 42, and determine the second transmitting antenna in the third antenna 51 and the fourth antenna 52 according to an environmental reference signal. In the mode of transmitting by using one link and receiving by using four links, the processor 7 may determine the transmitting antenna in the first antenna 41, the second antenna 42, the third antenna 51, and the fourth antenna 52 according to an environmental reference signal.

As shown in FIG. 1 and FIG. 2, in the mode of transmitting by using two links and receiving by using four links, the processor 7 is connected to the network to monitor the environmental reference signal in real time. For the first communication module 11, the processor 7 needs to determine an antenna with a better environmental reference signal in the first antenna 41 and the second antenna 42 as the first transmitting antenna. Then, the processor 7 sends a control signal to the second switch 31, so that the first transmitting/receiving port 112 of the first communication module 11 is connected to the first transmitting antenna through the second switch 31, and the first signal reception port 113 of the first communication module 11 is connected to another antenna through the second switch 31.

The processor 7 may control the first switch 2 in advance to connect the first transmitting port 111 of the first communication module 11 to the first port or the second port of the modem 6. In a case of signal transmission, the processor 7 controls the first single-pole-double-throw switch 119 to connect the first power amplifier 114 to the first transmitting/receiving filter 115. At this time, a transmitted signal enters the first transmitting port 111 from the first port or the second port of the modem 6 through the first switch 2, is transmitted by the first transmitting port 111 to the first power amplifier 114, is amplified in the first power amplifier 114, then is transmitted to the first transmitting/receiving filter 115, is filtered in the first transmitting/receiving filter 115, and is transmitted to the first transmitting antenna through the first transmitting/receiving port 112 and the second switch 31. The signal is sent by the first transmitting antenna.

When receiving a radio frequency signal, the processor 7 can control the first power amplifier 114 to be in a turn-off state, and control the first single-pole-double-throw switch 119 to connect the first transmission port 117 to the first transmitting/receiving filter 115. Based on an initial default configuration of the second switch 31, a channel of radio frequency signal received by the antenna is transmitted to the first transmitting/receiving filter 115 through the first transmitting/receiving port 112, and then is transmitted to the first transmission port 117 after the filtering is completed. Based on an initial default configuration of the second switch 31, another channel of radio frequency signal received by the antenna is transmitted to the first receiving filter 116 through the first signal reception port 113, and then is transmitted to the second transmission port 118 after filtering is completed. The first transmission port 117 and the second transmission port 118 are connected to the receiving port of the modem 6, to realize signal transmission to the modem 6, and the modem 6 processes the received signal and then transmits the signal to the baseband processor.

It should be noted that a connection status of the first port and the second port of the modem 6 and the first communication module 11 and the second communication module 12 may be autonomously set by a user.

For the second communication module 12, the processor 7 needs to determine an antenna with a better environmental reference signal in the third antenna 51 and the fourth antenna 52 as the second transmitting antenna. Then, the processor 7 sends a control signal to the third switch 32, so that the second transmitting/receiving port 122 of the second communication module 12 is connected to the second transmitting antenna through the third switch 32, and the second signal reception port 123 of the second communication module 12 is connected to another antenna through the third switch 32.

The processor 7 may control the first switch 2 in advance to connect the second transmitting port 121 of the second communication module 12 to the second port or the first port of the modem 6. In a case of signal transmission, the processor 7 controls the second single-pole-double-throw switch 129 to connect the second power amplifier 124 to the second transmitting/receiving filter 125. At this time, a transmitted signal enters the second transmitting port 121 from the second port or the first port of the modem 6 through the first switch 2, is transmitted by the second transmitting port 121 to the second power amplifier 124, is amplified in the second power amplifier 124, then is transmitted to the second transmitting/receiving filter 125, is filtered in the second transmitting/receiving filter 125, and is transmitted to the second transmitting antenna through the second transmitting/receiving port 122 and the third switch 32. The signal is sent by the second transmitting antenna.

In the case of receiving a radio frequency signal, the processor 7 can control the second power amplifier 124 to be in a turn-off state, and control the second single-pole-double-throw switch 129 to connect the third transmission port 127 to the second transmitting/receiving filter 125. Based on an initial default configuration of the third switch 32, a channel of radio frequency signal received by the antenna is transmitted to the second transmitting/receiving filter 125 through the second transmitting/receiving port 122, and then is transmitted to the third transmission port 127 after the filtering is completed. Based on an initial default configuration of the third switch 32, another channel of radio frequency signal received by the antenna is transmitted to the second receiving filter 126 through the second signal reception port 123, and then is transmitted to the fourth transmission port 128 after filtering is completed. The third transmission port 127 and the fourth transmission port 128 are connected to the receiving port of the modem 6, to transmit a signal to the modem 6. The modem 6 processes the received signal and then transmits the signal to the baseband processor.

In the above process, the first transmitting antenna and the second transmitting antenna are determined by monitoring the environmental reference signal in real time, and the determined first transmitting antenna and second transmitting antenna are used for transmission, to achieve the mode of transmitting by using two links and receiving by using four links and improve communication quality.

As shown in FIG. 1 and FIG. 2, in the mode of transmitting by using one link and receiving by using four links, the processor 7 is connected to the network to monitor the environmental reference signal in real time. An antenna with a better environmental reference signal is determined in the first antenna 41, the second antenna 42, the third antenna 51, and the fourth antenna 52 as the transmitting antenna. In a case that the transmitting antenna is the first antenna 41 or the second antenna 42, the processor 7 may control the second communication module 12 to be in a turn-off state to save power, and can still control the third switch 32 to connect the second transmitting/receiving port 122 of the second communication module 12 to the third antenna 51 or the fourth antenna 52, and connect the second signal reception port 123 of the second communication module 12 to the fourth antenna 52 or the third antenna 51.

The processor 7 controls the first communication module 11 to be in an active state, and a control signal is sent to the second switch 31, so that the first transmitting/receiving port 112 of the first communication module 11 is connected to the transmitting antenna through the second switch 31, and the first signal reception port 113 of the first communication module 11 is connected to another antenna through the second switch 31.

The processor 7 may control the first switch 2 in advance to connect the first transmitting port 111 of the first communication module 11 to the first port or the second port of the modem 6 and connect the second transmitting port 121 of the second communication module 12 to the second port or the first port of the modem 6.

In a case of signal transmission, the processor 7 controls the first single-pole-double-throw switch 119 to connect the first power amplifier 114 to the first transmitting/receiving filter 115. At this time, a transmitted signal enters the first transmitting port 111 from the first port or the second port of the modem 6 through the first switch 2, is transmitted by the first transmitting port 111 to the first power amplifier 114, is amplified in the first power amplifier 114, is transmitted to the first transmitting/receiving filter 115, is filtered in the first transmitting/receiving filter 115, and is transmitted to the transmitting antenna through the first transmitting/receiving port 112 and the second switch 31. The signal is sent by the transmitting antenna.

In the case of receiving a radio frequency signal, the processor 7 can control the first power amplifier 114 to be in a turn-off state, control the first single-pole-double-throw switch 119 to connect the first transmission port 117 to the first transmitting/receiving filter 115, control the second communication module 12 to turn on, and control the second single-pole-double-throw switch 129 to connect the third transmission port 127 to the second transmitting/receiving filter 125. At this time, the processor 7 can control the first power amplifier 114 and the second power amplifier 124 to be in a turn-off state. For the first antenna 41 or the second antenna 42, based on an initial default configuration of the second switch 31, a channel of radio frequency signal received by the antenna is transmitted to the first transmitting/receiving filter 115 through the first transmitting/receiving port 112, and then is transmitted to the first transmission port 117 after the filtering is completed. Based on an initial default configuration of the second switch 31, another channel of radio frequency signal received by the antenna is transmitted to the first receiving filter 116 through the first signal reception port 113, and then is transmitted to the second transmission port 118 after filtering is completed. For the third antenna 51 or the fourth antenna 52, based on an initial default configuration of the third switch 32, a channel of radio frequency signal received by the antenna is transmitted to the second transmitting/receiving filter 125 through the second transmitting/receiving port 122, and then is transmitted to the third transmission port 127 after the filtering is completed. Based on an initial default configuration of the third switch 32, another channel of radio frequency signal received by the antenna is transmitted to the second receiving filter 126 through the second signal reception port 123, and then is transmitted to the fourth transmission port 128 after filtering is completed.

The first transmission port 117, the second transmission port 118, the third transmission port 127, and the fourth transmission port 128 are connected to the receiving port of the modem 6, to realize signal transmission to the modem 6, and the modem 6 processes the received signal and then transmits the signal to the baseband processor.

In summary, in a transmitting phase, the processor may control the first transmitting link of the first communication module to achieve radio frequency signal transmission. In a receiving phase, the processor may control the first receiving link and the second receiving link of the first communication module to be conducted, control the second communication module to turn on, and control the third receiving link and the fourth receiving link of the second communication module to be conducted, to realize radio frequency signal reception.

In a case that the transmitting antenna is the third antenna 51 or the fourth antenna 52, the processor 7 may control the first communication module 11 to be in a turn-off state to save power, and can still control the second switch 31 to connect the first transmitting/receiving port 112 of the first communication module 11 to the first antenna 41 or the second antenna 42, and connect the first signal reception port 113 of the first communication module 11 to the second antenna 42 or the first antenna 41.

The processor 7 controls the second communication module 12 to be in an active state, and a control signal is sent to the third switch 32, so that the second transmitting/receiving port 122 of the second communication module 12 is connected to the transmitting antenna through the third switch 32, and the second signal reception port 123 of the second communication module 12 is connected to another antenna through the third switch 32.

The processor 7 may control the first switch 2 in advance to connect the first transmitting port 111 of the first communication module 11 to the first port or the second port of the modem 6 and connect the second transmitting port 121 of the second communication module 12 to the second port or the first port of the modem 6.

In a case of signal transmission, the processor 7 controls the second single-pole-double-throw switch 129 to connect the second power amplifier 124 to the second transmitting/receiving filter 125. At this time, a transmitted signal enters the second transmitting port 121 from the first port or the second port of the modem 6 through the first switch 2, is transmitted by the second transmitting port 121 to the second power amplifier 124, is amplified in the second power amplifier 124, then is transmitted to the second transmitting/receiving filter 125, is filtered in the second transmitting/receiving filter 125, and is transmitted to the transmitting antenna through the second transmitting/receiving port 122 and the third switch 32. The transmitting antenna performs signal transmission.

In the case of receiving a radio frequency signal, the processor 7 can control the second power amplifier 124 to be in a turn-off state, control the second single-pole-double-throw switch 129 to connect the third transmission port 127 to the second transmitting/receiving filter 125, control the first communication module 11 to turn on, and control the first single-pole-double-throw switch 119 to connect the first transmission port 117 to the first transmitting/receiving filter 115. At this time, the processor 7 can control the first power amplifier 114 and the second power amplifier 124 to be in a turn-off state. For the first antenna 41 or the second antenna 42, based on an initial default configuration of the second switch 31, a channel of radio frequency signal received by the antenna is transmitted to the first transmitting/receiving filter 115 through the first transmitting/receiving port 112, and then is transmitted to the first transmission port 117 after the filtering is completed. Based on an initial default configuration of the second switch 31, another channel of radio frequency signal received by the antenna is transmitted to the first receiving filter 116 through the first signal reception port 113, and then is transmitted to the second transmission port 118 after filtering is completed. For the third antenna 51 or the fourth antenna 52, based on an initial default configuration of the third switch 32, a channel of radio frequency signal received by the antenna is transmitted to the second transmitting/receiving filter 125 through the second transmitting/receiving port 122, and then is transmitted to the third transmission port 127 after the filtering is completed. Based on an initial default configuration of the third switch 32, another channel of radio frequency signal received by the antenna is transmitted to the second receiving filter 126 through the second signal reception port 123, and then is transmitted to the fourth transmission port 128 after filtering is completed.

In summary, in a transmitting phase, the processor may control the second transmitting link of the second communication module to achieve radio frequency signal transmission. In a receiving phase, the processor may control the third receiving link and the fourth receiving link of the second communication module to be conducted, control the first communication module to turn on, and control the first receiving link and the second receiving link of the first communication module to be conducted, to realize radio frequency signal reception.

In the embodiments of the present disclosure, the first single-pole-double-throw switch 119 and the second single-pole-double-throw switch 129 are connected to the processor 7, and may switch between states according to the control of the processor 7, and the first power amplifier 114 and the second power amplifier 124 are connected to the processor 7, and may switch between a working state and a non-working state according to the control of the processor 7.

Through the cooperation of the first switch, the second switch, and the third switch, the modes of transmitting by using one link and receiving by using four links and transmitting by using two links and receiving by using four links are compatible. At the same time, the transmitting antenna switches between the 4 antennas. Through the cooperation between the processor and the signal transceiver apparatus, an antenna with a better uplink may be selected according to the environmental reference signal, to ensure the communication quality of the signal transceiver apparatus and avoid the problem of poor communication quality in complex scenarios.

In summary, the implementation process of modes of transmitting by using one link and receiving by using four links and transmitting by using two links and receiving by using four links is provided above. By disposing the first switch, the second switch, and the third switch, insertion loss of the receiving link may be reduced, performance of the transmitting link may be improved, and the wire length may be reduced. In addition, this can ensure the compatibility of modes of transmitting by using one link and receiving by using four links and transmitting by using two links and receiving by using four links, the selection of the uplink according to the environmental reference signal, and ensure the communication quality. Besides, the structural design may reduce the design complexity of the terminal device, improve the performance, and reduce manufacturing costs.

Figure 3:
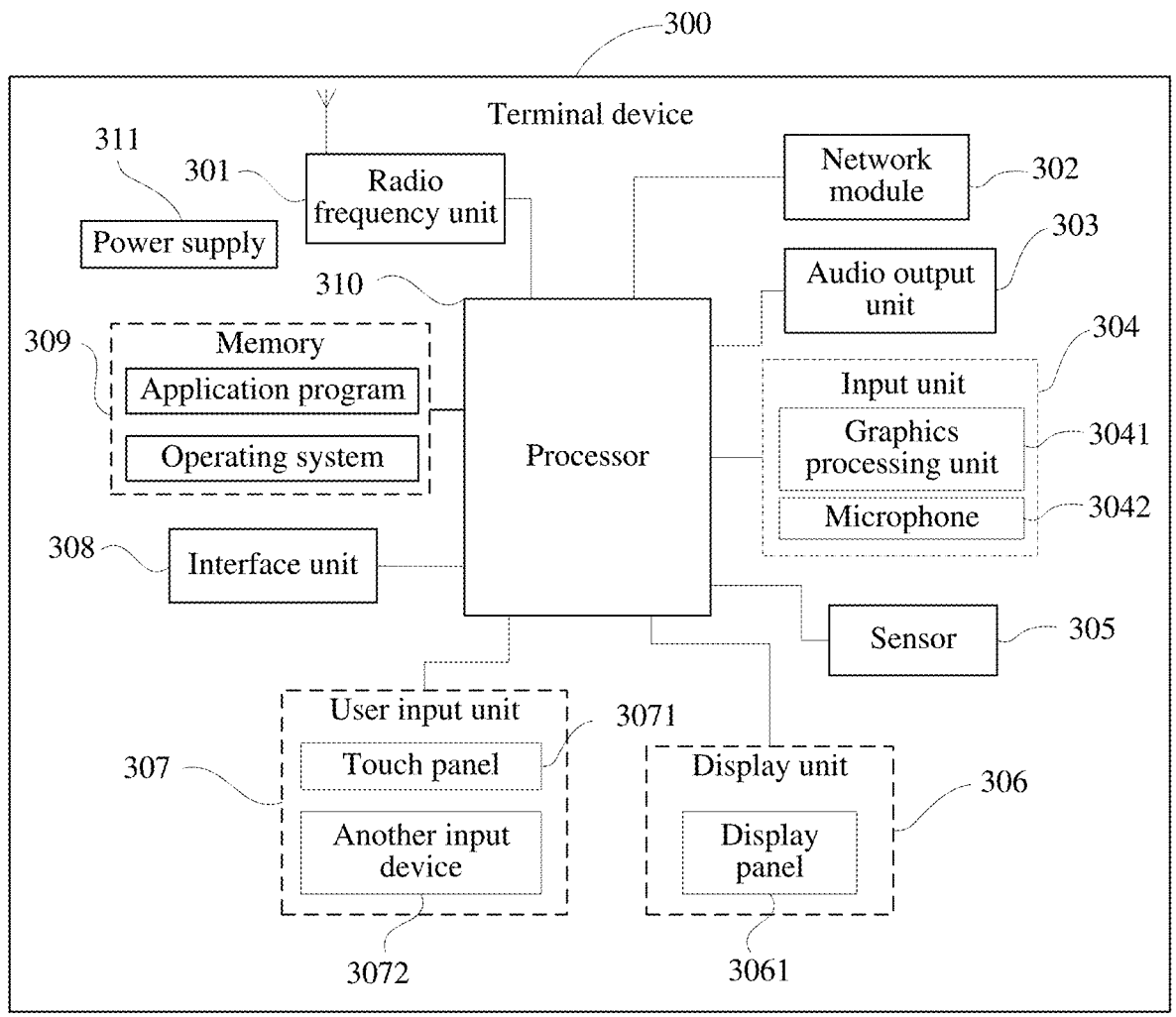
FIG. 3 is a schematic diagram of a hardware structure of a terminal device according to an embodiment of the present disclosure.

FIG. 3 is a schematic diagram of a hardware structure of a terminal device implementing the various embodiments of the present disclosure. The terminal device 300 includes, but not limited to: a radio frequency unit 301, a network module 302, an audio output unit 303, an input unit 304, a sensor 305, a display unit 306, a user input unit 307, an interface unit 308, a memory 309, a processor 310, a power supply 311, and the like.

A person skilled in the art may understand that the structure of the terminal device shown in FIG. 3 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

It should be understood that in this embodiment of this disclosure, the radio frequency unit 301 may be configured to receive and send signals in a process of receiving and sending information or calling. For example, the radio frequency unit 301 receives downlink data from a base station for processing by the processor 310, and sends uplink data to the base station. Generally, the radio frequency unit 301 includes, but is not limited to, an antenna, at least one amplifier, a transceiver, a coupler, a low noise amplifier, a duplexer, and the like. In addition, the radio frequency unit 301 may further communicate with other devices through a wireless communications system and network.

The radio frequency unit 301 includes: a first communication module and a second communication module; a first switch connected to a first terminal of the first communication module and a first terminal of the second communication module; a second switch connected to a second terminal of the first communication module, and a first antenna structure connected to the second switch; and a third switch connected to a second terminal of the second communication module, and a second antenna structure connected to the third switch. The first communication module corresponds to a first transmitting link and two receiving links, the second communication module corresponds to a second transmitting link and two receiving links; in a case of signal transmission, at least one of the first transmitting link and the second transmitting link is in a conductive state, and in a case of signal reception, the two receiving links corresponding to the first communication module and the two receiving links corresponding to the second communication module are all in a conductive state.

The first switch, the second switch, and the third switch are all double-pole-double-throw switches.

The radio frequency module 301 further includes: a modem. A first terminal of the first switch is connected to a first port and a second port of the modem, and a second terminal of the first switch is connected to a first transmitting port of the first communication module and a second transmitting port of the second communication module.

A first terminal of the second switch is connected to a first transmitting/receiving port and a first signal reception port of the first communication module, and a second terminal of the second switch is connected to a first antenna and a second antenna of the first antenna structure.

A first terminal of the third switch is connected to a second transmitting/receiving port and a second signal reception port of the second communication module, and a second terminal of the third switch is connected to a third antenna and a fourth antenna of the second antenna structure.

The first communication module further includes: a first power amplifier, a first transmitting/receiving filter, a first receiving filter, a first transmission port, a second transmission port, and a first single-pole-double-throw switch. The first power amplifier is connected to the first transmitting port, the first transmitting/receiving filter is connected to the first transmitting/receiving port, a first non-movable terminal of the first single-pole-double-throw switch is connected to the first power amplifier, a second non-movable terminal of the first single-pole-double-throw switch is connected to the first transmission port, a movable terminal of the first single-pole-double-throw switch is connected to the first transmitting/receiving filter, the second transmission port is connected to the first signal reception port through the first receiving filter, and the first transmission port and the second transmission port are both connected to a receiving port of the modem.

In a case that the first transmitting link corresponding to the first communication module is conducted, the movable terminal and the first non-movable terminal of the first single-pole-double-throw switch are connected, the modem, the first switch, the first transmitting port, the first power amplifier, the first single-pole-double-throw switch, the first transmitting/receiving filter, the first transmitting/receiving port, the second switch, and a first transmitting antenna are connected in sequence, and the first transmitting antenna is the first antenna or the second antenna.

The first communication module corresponds to the first receiving link and the second receiving link. In a case that the first receiving link corresponding to the first communication module is conducted, the movable terminal and the second non-movable terminal of the first single-pole-double-throw switch are connected, and the first receiving antenna, the second switch, the first transmitting/receiving port, the first transmitting/receiving filter, the first single-pole-double-throw switch, the first transmission port, and the modem are connected in sequence;

In a case that the second receiving link corresponding to the first communication module is conducted, the second receiving antenna, the second switch, the first signal reception port, the first receiving filter, the second transmission port, and the modem are connected in sequence; and each of the first receiving antenna and the second receiving antenna is one of the first antenna and the second antenna.

The second communication module further includes: a second power amplifier, a second transmitting/receiving filter, a second receiving filter, a third transmission port, a fourth transmission port, and a second single-pole-double-throw switch; where the second power amplifier is connected to the second transmitting port, the second transmitting/receiving filter is connected to the second transmitting/receiving port, a first non-movable terminal of the second single-pole-double-throw switch is connected to the second power amplifier, a second non-movable terminal of the second single-pole-double-throw switch is connected to the third transmission port, a movable terminal of the second single-pole-double-throw switch is connected to the second transmitting/receiving filter, the fourth transmission port is connected to the second signal reception port through the second receiving filter, and the third transmission port and the fourth transmission port are both connected to a receiving port of the modem.

In a case that the second transmitting link corresponding to the second communication module is conducted, the movable terminal and the first non-movable terminal of the second single-pole-double-throw switch are connected, the modem, the first switch, the second transmitting port, the second power amplifier, the second single-pole-double-throw switch, the second transmitting/receiving filter, the second transmitting/receiving port, the third switch, and a second transmitting antenna are connected in sequence, and the second transmitting antenna is the third antenna or the fourth antenna.

The second communication module corresponds to the third receiving link and the fourth receiving link. In a case that the third receiving link corresponding to the second communication module is conducted, the movable terminal and the second non-movable terminal of the second single-pole-double-throw switch are connected, and the third receiving antenna, the third switch, the second transmitting/receiving port, the second transmitting/receiving filter, the second single-pole-double-throw switch, the third transmission port, and the modem are connected in sequence;

In a case that the fourth receiving link corresponding to the second communication module is conducted, the fourth receiving antenna, the third switch, the second signal reception port, the second receiving filter, the fourth transmission port, and the modem are connected in sequence; and each of the third receiving antenna and the fourth receiving antenna is one of the third antenna and the fourth antenna.

The first communication module and the second communication module are both 5G communication modules.

The processor 310 is connected to the first switch, the second switch, the third switch, the first communication module, and the second communication module.

The terminal device provides a user with wireless broadband Internet access through the network module 302, for example, helps the user send and receive emails, browse web pages, and access streaming media.

The audio output unit 303 can convert audio data received by the radio frequency unit 301 or the network module 302 or stored in the memory 309 into an audio signal, and output the audio signal as sound. In addition, the audio output unit 303 may further provide audio output (for example, call signal receiving sound or message receiving sound) related to a specific function performed by the terminal device 300. The audio output unit 303 includes a speaker, a buzzer, a telephone receiver, and the like.

The input unit 304 is configured to receive audio or video signals. The input unit 304 may include a graphics processing unit (GPU) 3041 and a microphone 3042. The graphics processing unit 3041 processes image data of a static image or a video obtained by an image capturing apparatus (for example, a camera) in a video capturing mode or an image capturing mode. A processed image frame may be displayed on the display unit 306. The image frame processed by the graphics processing unit 3041 may be stored in the memory 309 (or another storage medium) or sent through the radio frequency unit 301 or the network module 302. The microphone 3042 may receive a sound and can process such sound into audio data. Processed audio data may be converted, in telephone call mode, into a format that may be sent to a mobile communication base station via the radio frequency unit 301 for output.

The terminal device 300 further includes at least one sensor 305, such as an optical sensor, a motion sensor, and other sensors. For example, the optical sensor includes an ambient optical sensor and a proximity sensor. The ambient optical sensor may adjust luminance of the display panel 3061 based on brightness of ambient light. The proximity sensor may turn off the display panel 3061 and/or backlight when the terminal device 300 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 305 may further include a fingerprint sensor, a pressure sensor, an iris sensor, a molecular sensor, a gyroscope, a barometer, a hygrometer, a thermometer, and an infrared sensor. Details are not described herein.

The display unit 306 is configured to display information input by a user or information provided to a user. The display unit 306 may include a display panel 3061, and the display panel 3061 may be configured in a form of liquid crystal display (LCD), organic light-emitting diode (OLED), or the like.

The user input unit 307 may be configured to receive input numeral or character information, and generate key signal input related to user setting and function control of the terminal device. For example, the user input unit 307 includes a touch panel 3071 and another input device 3072. The touch panel 3071 is also referred to as a touchscreen, and may collect a touch operation performed by a user on or near the touch panel 3071 (such as an operation performed by a user on the touch panel 3071 or near the touch panel 3071 by using any proper object or accessory, such as a finger or a stylus). The touch panel 3071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 310, receives a command sent by the processor 310, and executes the command. In addition, the touch panel 3071 may be implemented in various types such as resistive, capacitive, infrared, and surface acoustic wave. In addition to the touch panel 3071, the user input unit 307 may also include the another input device 3072. For example, the another input device 3072 may include, but not limited to, a physical keyboard, a function key (for example, a volume control key or a switch key), a trackball, a mouse, and a joystick. Details are not described herein.

Optionally, the touch panel 3071 may cover the display panel 3061. In the case of detecting a touch operation on or near the touch panel 3071, the touch panel 3071 transmits the touch operation to the processor 310 to determine a type of a touch event. Then the processor 310 provides corresponding visual output on the display panel 3061 based on the type of the touch event. Although in FIG. 3, the touch panel 3071 and the display panel 3061 are configured as two independent components to implement input and output functions of the terminal device, in some embodiments, the touch panel 3071 and the display panel 3061 may be integrated to implement the input and output functions of the terminal device. Details are not limited herein.

The interface unit 308 is an interface for connecting an external apparatus to the terminal device 300. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 308 may be configured to receive an input (for example, data information or power) from an external apparatus and transmit the received input to one or more elements in the terminal device 300, or transmit data between the terminal device 300 and the external apparatus.

The memory 309 may be configured to store a software program and various data. The memory 309 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 309 may include a high-speed random access memory or a nonvolatile memory, for example, at least one disk storage device, a flash memory, or another volatile solid-state storage device.

The processor 310 is a control center of the terminal device, connects various parts of the entire terminal device by using various interfaces and circuits, and performs various functions of the terminal device and processes data by running or executing the software programs and/or the modules stored in the memory 309 and invoking data stored in the memory 309, so as to monitor the terminal device as a whole. The processor 310 may include one or more processing units. Optionally, the processor 310 may be integrated with an application processor and a modem processor. The application processor mainly processes an operating system, a user interface, an application program, and the like, and the modem processor mainly processes wireless communication. It may be understood that alternatively, the modem processor may not be integrated into the processor 310.

The terminal device 300 may further include the power supply 311 (such as a battery) that supplies power to each component. Optionally, the power supply 311 may be logically connected to the processor 310 by using a power management system, to implement functions such as charging, discharging, and power consumption management by using the power management system.

In addition, the terminal device 300 includes some functional modules that are not shown. Details are not described herein.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element. The use of "at least one of A and B" in the specification and the claims should be understood as "only A exists, only B exists, or both A and B exist".

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to related technologies may be implemented in a form of a software product. The computer software product is stored in a storage medium (such as a read-only memory (ROM)/ random access memory (RAM), a magnetic disk, or an optical disc) and includes several instructions for instructing user equipment (which may be a mobile phone, a computer, a server, an air conditioner, or a network device) to execute the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A signal transceiver apparatus, comprising:
    a first communication module and a second communication module;
    a first switch connected to a first terminal of the first communication module and a first terminal of the second communication module, respectively;
    a second switch connected to a first transmitting/receiving port and a first signal reception port of the first communication module, a first antenna structure connected to the second switch; and
    a third switch connected to a second transmitting/receiving port and a second signal reception port of the second communication module, and a second antenna structure connected to the third switch,
    wherein the first communication module corresponds to a first transmitting link and two receiving links, the second communication module corresponds to a second transmitting link and two receiving links; in a case of signal transmission, at least one of the first transmitting link and the second transmitting link is in a conductive state; and in a case of signal reception, the two receiving links corresponding to the first communication module and the two receiving links corresponding to the second communication module are all in a conductive state;
    wherein the first switch, the second switch, and the third switch are all double-pole-double-throw switches;
    wherein the signal transceiver apparatus further comprises a modem;
    wherein a first terminal of the first switch is connected to a first port and a second port of the modem, and a second terminal of the first switch is connected to a first transmitting port of the first communication module and a second transmitting port of the second communication module; and
    wherein the first transmitting port is connected to a first non-movable terminal of the first switch, the second transmitting port is connected to a second non-movable terminal of the first switch, a first movable terminal of the first switch is connected to the first port of the modem, and a second movable terminal of the first switch is connected to the second port of the modem.

2. The signal transceiver apparatus according to claim 1, wherein
    a first terminal of the second switch is connected to the first transmitting/receiving port and the first signal reception port of the first communication module, and
    a second terminal of the second switch is connected to a first antenna and a second antenna of the first antenna structure.

3. The signal transceiver apparatus according to claim 2, wherein the first communication module comprises:
    a first power amplifier;
    a first transmitting/receiving filter;
    a first receiving filter;
    a first transmission port;
    a second transmission port; and
    a first single-pole-double-throw switch; wherein
    the first power amplifier is connected to the first transmitting port, the first transmitting/receiving filter is connected to the first transmitting/receiving port, a first non-movable terminal of the first single-pole-double-throw switch is connected to the first power amplifier, a second non-movable terminal of the first single-pole-double-throw switch is connected to the first transmission port, a movable terminal of the first single-pole-double-throw switch is connected to the first transmitting/receiving filter, the second transmission port is connected to the first signal reception port through the first receiving filter, and the first transmission port and the second transmission port are both connected to a receiving port of the modem.

4. The signal transceiver apparatus according to claim 3, wherein
    in a case that the first transmitting link corresponding to the first communication module is conducted, the movable terminal and the first non-movable terminal of the first single-pole-double-throw switch are connected, the modem, the first switch, the first transmitting port, the first power amplifier, the first single-pole-double-throw switch, the first transmitting/receiving filter, the first transmitting/receiving port, the second switch, and a first transmitting antenna are connected in sequence, and the first transmitting antenna is the first antenna or the second antenna.

5. The signal transceiver apparatus according to claim 3, wherein the first communication module corresponds to a first receiving link and a second receiving link of the two receiving links;
    in a case that the first receiving link corresponding to the first communication module is conducted, the movable terminal and the second non-movable terminal of the first single-pole-double-throw switch are connected, a first receiving antenna, the second switch, the first transmitting/receiving port, the first transmitting/receiving filter, the first single-pole-double-throw switch, the first transmission port, and the modem are connected in sequence;

in a case that the second receiving link corresponding to the first communication module is conducted, a second receiving antenna, the second switch, the first signal reception port, the first receiving filter, the second transmission port, and the modem are connected in sequence; and each of the first receiving antenna and the second receiving antenna is one of the first antenna and the second antenna.

6. The signal transceiver apparatus according to claim 1, wherein a first terminal of the third switch is connected to the second transmitting/receiving port and the second signal reception port of the second communication module, and a second terminal of the third switch is connected to a third antenna and a fourth antenna of the second antenna structure.

7. The signal transceiver apparatus according to claim 6, wherein the second communication module comprises:

a second power amplifier;
a second transmitting/receiving filter;
a second receiving filter;
a third transmission port;
a fourth transmission port; and
a second single-pole-double-throw switch, wherein the second power amplifier is connected to the second transmitting port, the second transmitting/receiving filter is connected to the second transmitting/receiving port, a first non-movable terminal of the second single-pole-double-throw switch is connected to the second power amplifier, a second non-movable terminal of the second single-pole-double-throw switch is connected to the third transmission port, a movable terminal of the second single-pole-double-throw switch is connected to the second transmitting/receiving filter, the fourth transmission port is connected to the second signal reception port through the second receiving filter, and the third transmission port and the fourth transmission port are both connected to a receiving port of the modem.

8. The signal transceiver apparatus according to claim 7, wherein in a case that the second transmitting link corresponding to the second communication module is conducted, the movable terminal and the first non-movable terminal of the second single-pole-double-throw switch are connected, the modem, the first switch, the second transmitting port, the second power amplifier, the second single-pole-double-throw switch, the second transmitting/receiving filter, the second transmitting/receiving port, the third switch, and a second transmitting antenna are connected in sequence, and the second transmitting antenna is the third antenna or the fourth antenna.

9. The signal transceiver apparatus according to claim 7, wherein the second communication module corresponds to a third receiving link and a fourth receiving link of the two receiving links;

in a case that the third receiving link corresponding to the second communication module is conducted, the movable terminal and the second non-movable terminal of the second single-pole-double-throw switch are connected, a third receiving antenna, the third switch, the second transmitting/receiving port, the second transmitting/receiving filter, the second single-pole-double-throw switch, the third transmission port, and the modem are connected in sequence;

in a case that the fourth receiving link corresponding to the second communication module is conducted, a fourth receiving antenna, the third switch, the second signal reception port, the second receiving filter, the fourth transmission port, and the modem are connected in sequence; and each of the third receiving antenna and the fourth receiving antenna is one of the third antenna and the fourth antenna.

10. The signal transceiver apparatus according to claim 1, wherein the first communication module and the second communication module are both fifth generation (5G) communication modules.

11. The signal transceiver apparatus according to claim 1, wherein the modem is connected to a baseband processor; in a case of signal transmission, the modem is configured to convert a baseband signal transmitted by the baseband processor into a radio frequency signal, and send the radio frequency signal through the first transmitting link and/or the second transmitting link; and in a case of signal reception, the modem is configured to convert a received radio frequency signal into a baseband signal and transmit the baseband signal to the baseband processor.

* * * * *